United States Patent Office 3,245,952
Patented Apr. 12, 1966

3,245,952
LIQUID PHASE HYDROFLUORINATION OF ALPHA-CHLOROSTYRENE
John Andrew Sedlak, Stamford, George Charles Gleckler, Springdale, and Ken Matsuda, Stamford, Conn., assignors to American Cyanamid Company, Stamford, Conn., a corporation of Maine
No Drawing. Original application Jan. 25, 1963, Ser. No. 254,000, now Patent No. 3,200,159, dated Aug. 10, 1965. Divided and this application Feb. 3, 1965, Ser. No. 430,209
2 Claims. (Cl. 260—651)

This application is a divisional application of our pending application having the Serial No. 254,000, filed January 25, 1963, and entitled, "Vapor Phase Hydrofluorination of Alpha-Chlorostyrene," now U.S. Patent 3,200,159, which in turn is a continuation-in-part application of our parent application having the Serial No. 188,973, filed April 20, 1962, and entitled, "Novel Monomer and Process for Preparing the Same," now U.S. Patent 3,207,797.

This invention relates to a process for preparing α,α-difluoroethylbenzene by reacting α-chlorostyrene with hydrogen fluoride. More particularly this invention relates to the process for preparing α,α-difluoroethylbenzene in a liquid phase operation.

One of the objects of the present invention is to produce α,α-difluoroethylbenzene. A further object of the present invention is to convert α-chlorostyrene to α,α-difluoroethylbenzene by reacting the former with hydrogen fluoride in a liquid phase. These and other objects of the present invention will be discussed in greater detail hereinbelow.

The process for preparing α,α-difluoroethylbenzene according to the concept of the present invention may be accomplished by use of a liquid phase process. In the liquid phase one will introduce the α-chlorostyrene and the hydrogen fluoride into a suitable solvent which is normally liquid at the reaction temperature and by maintaining the reaction temperature between about −20° and +20° C. the α,α-difluoroethylbenzene is produced. It is preferred to use a temperature of about 0° C. The organic normally liquid solvents which may be used in the process of the present invention are ethers such as dimethyl ether, diethyl ether, dipropyl ether, tetrahydrofuran and the like or ketones such as acetone, methyl ethyl ketone, cyclohexanone, and other oxygen containing organic solvents. These organic, normally liquid solvents are believed to form a complex with the hydrogen fluoride and by so doing moderate the reactivity of the hydrogen fluoride.

The mol ratio of the hydrogen fluoride to the α-chlorostyrene may be varied from about 2:1 to 10:1 respectively. The mol ratio of the solvent to the α-chlorostyrene may be varied from about 1:1 to about 6:1 respectively.

Reference is made to our parent application having the Serial No. 188,973 filed April 20, 1962 and entitled, "Novel Monomer and Process for Preparing the Same," now U.S. Patent 3,207,797. Our parent application discloses an alternative process for preparing α,α-difluoroethylbenzene by a vapor phase process.

If the percentage of α,α-difluoroethylbenzene in the ultimate reaction production is satisfactorily high and the amount of organic impurities is comparatively low, no fractional distillation step need be entertained. On the other hand, if the amount of the organic side reaction products and of unreacted α-chlorostyrene is comparatively higher, a fractional distillation step may be considered necessary.

In order that the concept of the present invention may be more completely understood, the following example is set forth in which all parts are parts by weight unless otherwise indicated. This example is set forth primarily for the purpose of illustration and any specific enumeration of detail contained therein should not be interpreted as a limitation on the case except as is indicated in the appended claims.

*Example 1*

Into a suitable reaction vessel equipped with a stainless steel thermowell and stainless steel stirrer there is added 23 parts of anhydrous hydrogen fluoride, cooled to Dry Ice temperature, over a 10 minute period to 44 parts of anhydrous diethyl ether also stirred at Dry Ice-acetone temperature. Some heat is evolved during the addition but the cooling is maintained at about −75° C. The hydrogen fluoride ether solution is then protected from atmospheric moisture and the Dry Ice bath is replaced by an ice-water bath. After the hydrogen fluoride ether solution adjusts to the ice-water bath temperature, 20 parts of the α-chlorostyrene is added dropwise over a 1 hour period with vigorous stirring. The stirring is continued for another hour following the addition of the α-chlorostyrene while maintaining the ice bath temperature. 53 parts of ether are then added and the cold mixture is poured into 200 parts of cracked ice and 100 parts of water contained in a stainless steel container. The resultant mixture is cooled and stirred while adding a sufficient amount of 33% (by weight) aqueous potassium hydroxide solution in order to make the aqueous phase basic. The ether layer is then separated and dried over anhydrous magnesium sulfate. The ether is removed by distillation at atmospheric pressure on a steam bath and the residue is distilled at 47 mm. of pressure to give the following fractions:

(1) 4.5 parts—B.P. 67.1° C.
(2) 1.6 parts—B.P. 67.1°–105° C.
(3) 1.5 parts—B.P. 105° C.+

The gas liquid chromotographic analysis showed that fraction 1 was substantially pure α,α-difluoroethylbenzene, fraction 2 was 80% α,α-difluoroethylbenzene while fraction 3 was predominantly acetophenone. The yield of α,α-difluoroethylbenzene was 5.8 parts or 28% yield based on the amount of α-chlorostyrene used. The α,α-difluoroethylbenzene is characterized by its infrared spectrum which showed absorption at 1388 cm.$^{-1}$ for —CH$_3$ and 1182 cm.$^{-1}$ for —CF$_2$—. The analysis is set forth hereinbelow:

Calculated for C$_8$H$_8$F$_2$: C, 67.61; H, 5.67; F, 26.74.
Found: C, 67.94; H, 5.70; F, 27.08.

We claim:
1. A process for preparing α,α-difluoroethylbenzene comprising reacting α-chlorostyrene with hydrogen fluoride dissolved in a liquid organic solvent selected from the group consisting of dimethyl ether, diethyl ether, dipropyl ether, tetrahydrofuran, acetone, methyl ethyl ketone and cyclohexanone at a temperature between about −20° and +20° C. wherein the mol ratio of hydrogen fluoride to α-chlorostyrene is between about 2:1 and 10:1 respectively and wherein the mol ratio of said solvent to α-chlorostyrene is between about 1:1 and 6:1 respectively.

2. A process for preparing α,α-difluoroethylbenzene comprising reacting α-chlorostyrene with hydrogen fluoride dissolved in a liquid organic solvent selected from the group consisting of dimethyl ether, diethyl ether, dipropyl ether, tetrahydrofuran, acetone, methyl ethyl ketone and cyclohexanone at about 0° C. wherein the mol ratio of hydrogen fluoride to α-chlorostyrene is between about 2:1 and 10:1 respectively and wherein the mol ratio of said solvent to α-chlorostyrene is between about 1:1 and 6:1 respectively.

References Cited by the Examiner
UNITED STATES PATENTS
2,622,106    1/1952    Stover _____ 260—653.7

OTHER REFERENCES

Henne et al.: "J. Amer. Chem. Soc.," vol. 65, pp. 1271–2 (1943).

Renoll: "J. Amer. Chem. Soc.," vol. 64, pp. 1115–6 (1942).

LEON ZITVER, *Primary Examiner.*

DANIEL D. HORWITZ, *Examiner.*

K. V. ROCKEY, *Assistant Examiner.*